M. SEGRE.
METHOD OF SCREW THREADING ARTICLES MADE OF HORN.
APPLICATION FILED AUG. 13, 1915.
1,227,680.
Patented May 29, 1917.
2 SHEETS—SHEET 1.
Fig.1
Fig.2
Fig.3
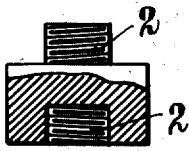
Fig.4
Fig.5
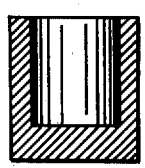
Fig.8
Fig.6
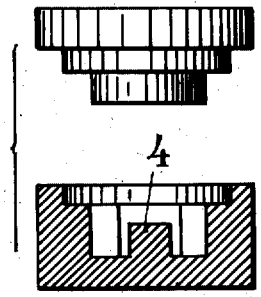
Fig.9
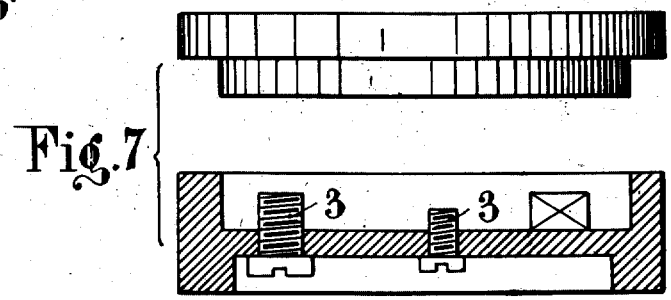
Fig.7
Mario Segre
Inventor
by Laurence Langner
Attorney.

M. SEGRE.
METHOD OF SCREW THREADING ARTICLES MADE OF HORN.
APPLICATION FILED AUG. 13, 1915.

1,227,680.  
Patented May 29, 1917.  
2 SHEETS—SHEET 2.

Mario Segre
Inventor
by Laurence Langner
Attorney

UNITED STATES PATENT OFFICE.

MARIO SEGRE, OF VERCELLI, ITALY.

METHOD OF SCREW-THREADING ARTICLES MADE OF HORN.

1,227,680. Specification of Letters Patent. Patented May 29, 1917.

Application filed August 13, 1915. Serial No. 45,355.

*To all whom it may concern:*

Be it known that I, MARIO SEGRE, a subject of the King of Italy, and resident of Vercelli, Italy, have invented certain new and useful Improved Methods of Screw-Threading Articles Made of Horn or Its Substitutes, of which the following is a specification.

This invention relates to the manufacture of articles of horny material or its artificial substitutes and has for its object to provide a method of forming screw threads on these articles.

It is known that owing to the fibrous nature of horny material articles made of this material cannot be provided with sufficiently true and resistant screw threads by the usual means, such as a screw tap or lathe, and that a good many articles made of horn have to be screw threaded in order to be fixed on to their supports or other members, which may be of metal.

The difficulty hitherto encountered is removed according to the present invention, by forming the screw threads by stamping, the horny material being compressed under heat in a matrix provided with the screw thread which it is desired to form on the article.

The accompanying drawings illustrate by way of example various forms of carrying out the invention:—

Figure 1 is a section of an internally screw threaded button; Fig. 2 illustrating an elevation and sectional elevation of the two parts of the corresponding matrix respectively;

Fig. 3 is an elevation of a screw having an enlarged head,

Fig. 4 is a sectional elevation of a cylinder provided with a screw threaded rod and a screw threaded hole;

Figs. 5 and 6 are a sectional elevation and a plan view respectively of a disk provided with screw threaded holes; Fig. 7 showing an elevation and sectional elevation of the two parts of the corresponding matrix respectively;

Fig. 8 is a sectional elevation of a screw-nut;

Figs. 9 and 10 illustrate matrices used for the manufacture of a pierced hexagonal head and of a screw-nut respectively;

Figure 10:
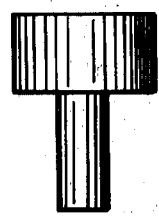
Figure 10:
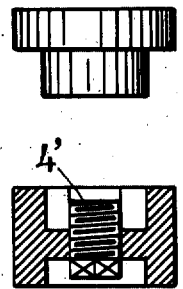

Referring to the drawings the screw thread is formed by compressing the horny material in a matrix which generally is also employed for imparting to the article to be manufactured its final shape.

When it is desired to form a screw thread in a recess provided in the article (Fig. 1), use is made of a punch provided with a screw threaded projection 1 (Fig. 2), around which the horny material rendered plastic by heat is forced by the pressure exerted in the matrix, whereby the screw threaded formation on the matrix is imparted to the recess. The punch being subsequently withdrawn together with the article screw threaded thereon, the latter can afterward be easily unscrewed.

The method of forming the screw thread shown in Fig. 3 is analogous, the matrix or punch being, however, in this case provided with a screw threaded hole into which penetrates the substance intended to form the screw threaded rod 2. The stamping of the member comprising a screw threaded rod 2 on the one side and a screw threaded hole 2′ on the opposite side, as illustrated in Fig. 4, is effected in the same way.

It is often required to provide articles of comparatively large dimensions, for example, a disk (Figs. 5 and 6) with several screw threaded holes. In this case the matrix is provided in the required positions with screw threaded rods 3 (Fig. 7) for forming screw threads in the horny material, the rods permitting of being subsequently unscrewed to allow the article to be withdrawn from the matrix. The screws may be provided with fly nuts in order to facilitate handling.

The method hereinbefore described may also be employed for the manufacture of hexagonal heads, for bolts or nuts (Fig. 8), the matrix in the first case comprising a projection 4 (see Fig. 9) intended to form a hole in the head, and in the second case a screw 4' (Fig. 10) which produces a screw threaded hole.

Figure 11:
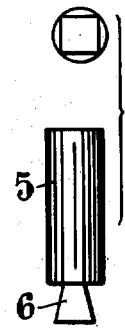
Fig. 11 illustrates a rod and Fig. 12 the matrix used for its manufacture.
Figure 12:
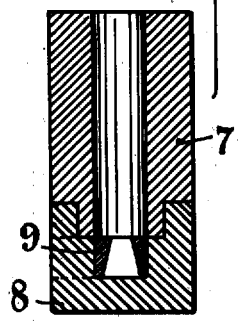
Figure 14:
Fig. 14 illustrates a complete bolt.
Figure 13:
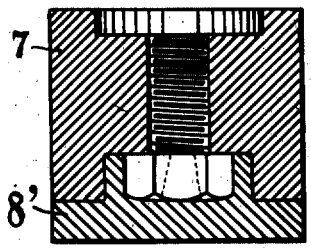
Fig. 13 being the matrix employed to form the screw thread on this rod and for coupling it with the hexagonal head.

For the manufacture of a complete bolt the rod 5 (Fig. 11) is first formed with a tenon 6 by which the rod is connected to a hexagonal head which is pierced axially and obtained by means of the matrix shown in Fig. 9. The blank thus obtained is afterward subjected to compression in a matrix, such as shown in Fig. 13, in which the two parts are secured together at the same time as the rod is screw threaded. The matrix shown in Fig. 12 comprises a sleeve 7 and a bottom 8 in which is mounted a split collar 9 intended to form the tenon 6 which has the shape of a truncated pyramid; similarly the matrix shown in Fig. 13 comprises an internally screw threaded sleeve 7' and a bottom 8' in which a space is left free for the head so that, when the matrix is taken to pieces the finished article (Fig. 14) can be withdrawn with the head secured to the rod.

The rod may be connected to the head by a screw thread which, in consequence of the pressure to which the unfinished article is subjected, becomes deformed, whereby unscrewing is prevented.

Figure 15:
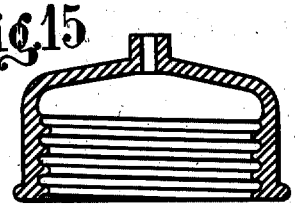
Fig. 15 is a sectional elevation of an internally screw threaded cap, and Fig. 16 an elevation and sectional elevation of the two parts of the corresponding matrix respectively.
Figure 16:
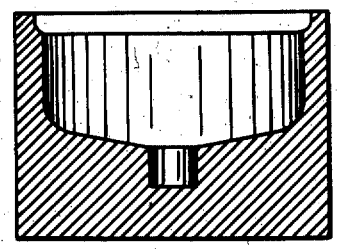

An internal or external screw thread may also be provided on a cap (Fig. 15) or on a cylindrical sleeve, by compressing the horny material in the interior of a suitable matrix, such as shown in Fig. 16.

The method hereinbefore described permits of easily imparting to objects of horny or like material internal or external screw threads which are true and rigid, since the horny material which is rendered plastic by heat takes the exact shape imparted to it by the matrix, so that the walls forming the screw threads are smooth and regular like the other surfaces of the manufactured article.

What I claim as my invention and desire to secure by U. S. Letters Patent is:—

1. A method of producing articles of animal horn or hoof provided with screw threads by stamping the material in a mold, consisting in inserting the matrix of the screw thread in the fixed part of the mold, introducing the blank of material in the mold and compressing it, and finally removing said matrix simultaneously from the mold and the finished article.

2. A method of producing articles of animal horn or hoof provided with a screw threaded hole by stamping the material in a mold, consisting in screwing into the wall of the mold from the outer side thereof a screw so that the same projects into the interior of the mold and constitutes the matrix of the screw thread, introducing the blank of material in the mold and compressing it, and finally unscrewing the screw from the mold and from the finished article.

3. A method of producing articles of animal horn or hoof provided with a plurality of screw threaded holes by stamping the material in a mold, consisting in screwing into the walls of the mold from the outer side thereof a corresponding number of screws so that they project into the interior of the mold, each screw forming the matrix for a screw threaded hole, introducing the blank of material in the mold and compressing it, and then unscrewing the screws from the mold and from the finished article.

Signed at Turin, Italy, this 24th day of July A. D. 1915.

MARIO SEGRE.

Witnesses:
MARIO TORTAY,
C. L. FEYLER.